(No Model.)
C. F. BRUSH.
SECONDARY BATTERY.
No. 275,986. Patented Apr. 17, 1883.
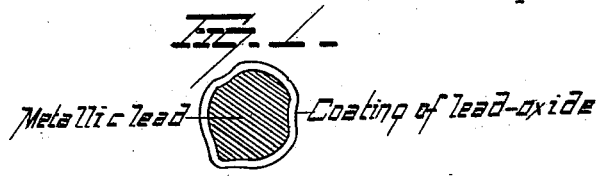
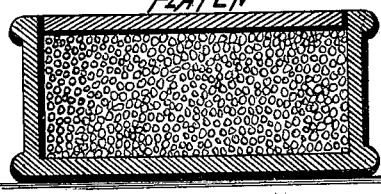
    
WITNESSES
George Cook.
George T. Downing.
INVENTOR
Charles F. Brush —
By Leggett & Leggett
Attorneys

UNITED STATES PATENT OFFICE.

CHARLES F. BRUSH, OF CLEVELAND, OHIO.

SECONDARY BATTERY.

SPECIFICATION forming part of Letters Patent No. 275,986, dated April 17, 1883.

Application filed May 27, 1882. (No model.)

*To all whom it may concern:*

Be it known that I, CHARLES F. BRUSH, of Cleveland, in the county of Cuyahoga and State of Ohio, have invented certain new and useful Improvements in Secondary Batteries; and I do hereby declare the following to be a full, clear, and exact description of the invention, such as will enable others skilled in the art to which it pertains to make and use the same.

My invention relates to a material from which the elements of a secondary or storage electric battery may be constructed; and said invention consists, broadly, in the following described substance or material as a new composition of matter for plates or elements for secondary batteries.

That which constitutes my invention may be best understood from the following description of a method by which it can be produced.

Take metallic lead in a pulverized, granulated, precipitated, or other finely-divided state, and allow the surface of the lead particles to become oxidized, either by exposure to the air or by any suitable artificial oxidizing process or application. After the particles of this finely-divided lead are thus oxidized place them in suitable molds or other receptacles and submit them to heavy pressure—hydraulic or otherwise—until they are united together into a coherent mass, more or less compact and solid, according to the amount of pressure exerted. The substance thus produced will, as is apparent, consist of a mass throughout the entire body of which metallic lead and oxide of lead are intimately associated; and from such a substance very effective elements for secondary or storage batteries can be made. It is true that if non-oxidized lead particles be subjected to very heavy pressure they will be perfectly welded into a single solid body, which, upon the closest inspection, will have every appearance of having been cast or rolled, all evidence of the former granules or particles having completely disappeared. This result and condition is but partially true in the case of the product which constitutes my invention herein referred to, because each particle of lead has a thin surface coating or film of oxide of lead; and when such particles are collected and subjected to great pressure the enveloping film or coating of lead oxide inclosing each particle is ruptured during the change of form that said particle undergoes during the aforesaid pressure, so that a portion only of the pure lead of any one particle can come into contact and be welded, as described, with the exposed pure lead of a neighboring particle that has likewise had its coating of lead oxide ruptured, yet the particles will be welded together to such an extent that they will strongly cohere and form a firm body throughout which, everywhere, ramifies and extends thin sheets, veins, or membranes of oxide of lead. These minute veins of lead oxide within and throughout the mass greatly facilitate the penetration of the electrical action in "forming" or oxidizing the plates for operative use in a secondary battery.

I do not limit myself to any particular temperature that the oxidized lead particles must have when subjected to the welding-pressure, as specified. Any temperature short of the fusing-point may be employed.

In constructing battery elements from my material the lead particles can, in some cases, be originally pressed in molds that will give to the finished product the shape desired for said elements; or it can be made in blocks, sheets, bars, strips, or otherwise, and afterward cut, fashioned, and constructed as may be desired into any particular form of element.

I do not limit myself to the degree of fineness to which the lead must be divided prior to its oxidation and reunion by pressure, as specified; nor do I limit myself to any exact amount of pressure to be exerted upon the oxidized particles of lead, so long as it is sufficient to unite them into a strongly-coherent mass. Effective secondary-battery elements can be constructed by covering or clothing one or more of the surfaces of an ordinary cast or rolled lead bar, plate, or strip with the substance herein described as my invention.

One method of constructing such a description of battery element is to cover one or more faces of a cast or rolled plate of lead or other suitable substance with the finely-divided lead, superficially oxidized, as described, and then by heavy pressure not only unite the oxidized lead particles into a mass, but also unite the mass to the plate or supporting-body, which plate I prefer to prepare for receiving its coating by scoring or roughening its surface, or piercing it with a number of perforations, as indicated in the drawings, wherein—

Figure 1 is an ideal representation of a particle of metallic lead having a coating of lead oxide. Fig. 2 represents a collection of these superficially-oxidized particles in a mold for imparting pressure and form to the particles. Fig. 3 is an ideal representation of a transverse section of a plate of the mass constituting my invention. Fig. 4 shows a perforated plate for receiving and retaining a coating of the substance constituting my improvement. Fig. 5 illustrates in section a scored or file-faced supporting-plate to which my substance is attached. Fig. 6 shows a combined ribbed and perforated supporting-plate. Fig. 7 shows an angularly-corrugated plate, and Fig. 8 a dovetail corrugated plate provided with an active coating.

For the sake of convenience in identifying this invention among others that I have made in the class of secondary batteries, I denominate it as "Case K."

What I claim is—

1. A secondary-battery element having its active or absorbing substance or material made of particles of metallic lead having their surfaces oxidized and united together into a firm and strongly-coherent body or mass, substantially as set forth.

2. A secondary-battery element consisting of particles of metallic lead having their surfaces oxidized and united together into a firm and strongly-coherent body or mass, substantially as set forth.

In testimony whereof I have signed my name to this specification in the presence of two subscribing witnesses.

CHARLES F. BRUSH.

Witnesses:
LEVERETT L. LEGGETT,
ELBERT H. BAKER.